United States Patent
Avetisian et al.

(10) Patent No.: US 7,114,427 B1
(45) Date of Patent: Oct. 3, 2006

(54) QUICK-LOOSENING MECHANICAL LINKING DEVICE

(75) Inventors: Vahan Avetisian, Newbury Park, CA (US); Eishi Kajita, Westlake Village, CA (US)

(73) Assignee: Special Devices, Inc., Moor Park, CA (US)

( * ) Notice: Subject to any disclaimer, the term of this patent is extended or adjusted under 35 U.S.C. 154(b) by 0 days.

(21) Appl. No.: 11/254,186

(22) Filed: Oct. 19, 2005

(51) Int. Cl.
*B64D 1/04* (2006.01)
(52) U.S. Cl. ....................................... 89/1.14
(58) Field of Classification Search ................ 89/1.14; 102/378; 411/19, 20
See application file for complete search history.

(56) References Cited

U.S. PATENT DOCUMENTS

| | | | | |
|---|---|---|---|---|
| 3,119,298 A | * | 1/1964 | Brown | 411/440 |
| 3,147,663 A | | 9/1964 | Brown | 85/33 |
| 3,262,351 A | | 7/1966 | Jensen | 85/33 |
| 3,541,920 A | * | 11/1970 | Heinz et al. | 89/1.14 |
| 4,158,322 A | | 6/1979 | Hardesty | 89/1 B |
| 4,244,386 A | | 1/1981 | Hardesty | 137/68 A |
| 5,119,555 A | | 6/1992 | Johnson | 29/254 |
| 5,402,728 A | | 4/1995 | Garner | 102/326 |
| 6,568,184 B1 | | 5/2003 | Blackburn et al. | 60/636 |
| 6,662,702 B1 | | 12/2003 | Vidot et al. | 89/1.14 |

* cited by examiner

*Primary Examiner*—Michael J Carone
*Assistant Examiner*—Gabriel J. Klein
(74) *Attorney, Agent, or Firm*—Law Offices of Thomas J. Brindisi

(57) ABSTRACT

A quick-loosening mechanical linking device that includes housing, a release cavity having a predetermined height, a bolt, and an actuator. The bolt is disposed within the housing and includes an attachment means projecting out from the housing, a release zone such as an intended failure zone, and a head with a piston face. Upon actuation of the actuator, the bolt deforms and/or fails at the release zone and the attachment means moves farther out from the housing by a distance equal to the height of the release cavity. The release cavity preferably includes an abutment formed at its bottom, and the actuator is preferably an electric initiator having a pyrotechnic charge.

18 Claims, 3 Drawing Sheets

QUICK-LOOSENING MECHANICAL LINKING DEVICE

FIELD OF THE INVENTION

The present invention relates to the field of releasable mechanical linking devices, and more particularly, to an actuatable quick-loosening mechanical linking device.

BACKGROUND OF THE INVENTION

Prior art releasable mechanical linking devices typically utilize a sliding piston disposed within a hollow bolt and actuated by a pyrotechnic charge that rapidly accelerates the piston into another portion of the bolt forcefully enough to break the bolt and free the hitherto mechanically linked object. In some applications (e.g., within an automobile passenger compartment), however, it may not be desired to completely release the mechanical link upon actuation. Complete release may be prevented by attaching the mechanical linking device to a second mechanical linking device so as to contain the parts upon breakage of the bolt, but that adds complexity and cost by increasing the size, mass, and number of components.

SUMMARY OF THE INVENTION

The salient features of the quick-loosening mechanical linking device of the present invention are a housing, a release cavity having a predetermined height, a bolt, and an actuator. The bolt is disposed within the housing, and includes an attachment means projecting out from the housing, a release zone comprising an intended deformation and/or failure zone, and a head with a piston face. Actuation of the actuator causes the bolt to deform and/or fail at the release zone and the attachment means to move farther out from the housing by a distance equal to the height of the release cavity. The release cavity may preferably include an abutment formed at its bottom, and the actuator may preferably be an electric initiator having a pyrotechnic charge.

DETAILED DESCRIPTION OF A PREFERRED EMBODIMENT

Figure 1:
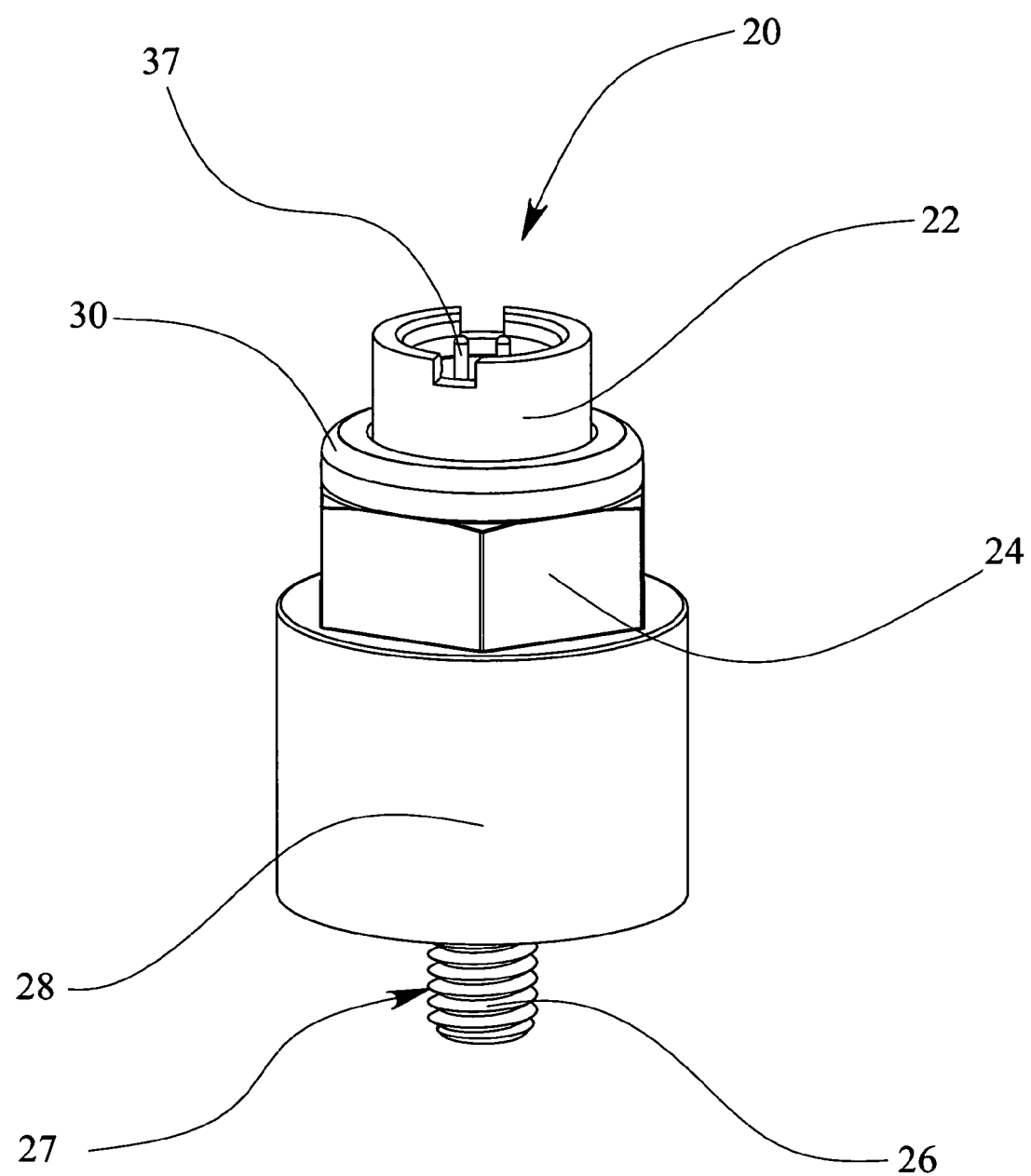
FIG. 1 is a perspective view of a first embodiment of a quick-loosening mechanical linking device according to the present invention.
Figure 2:
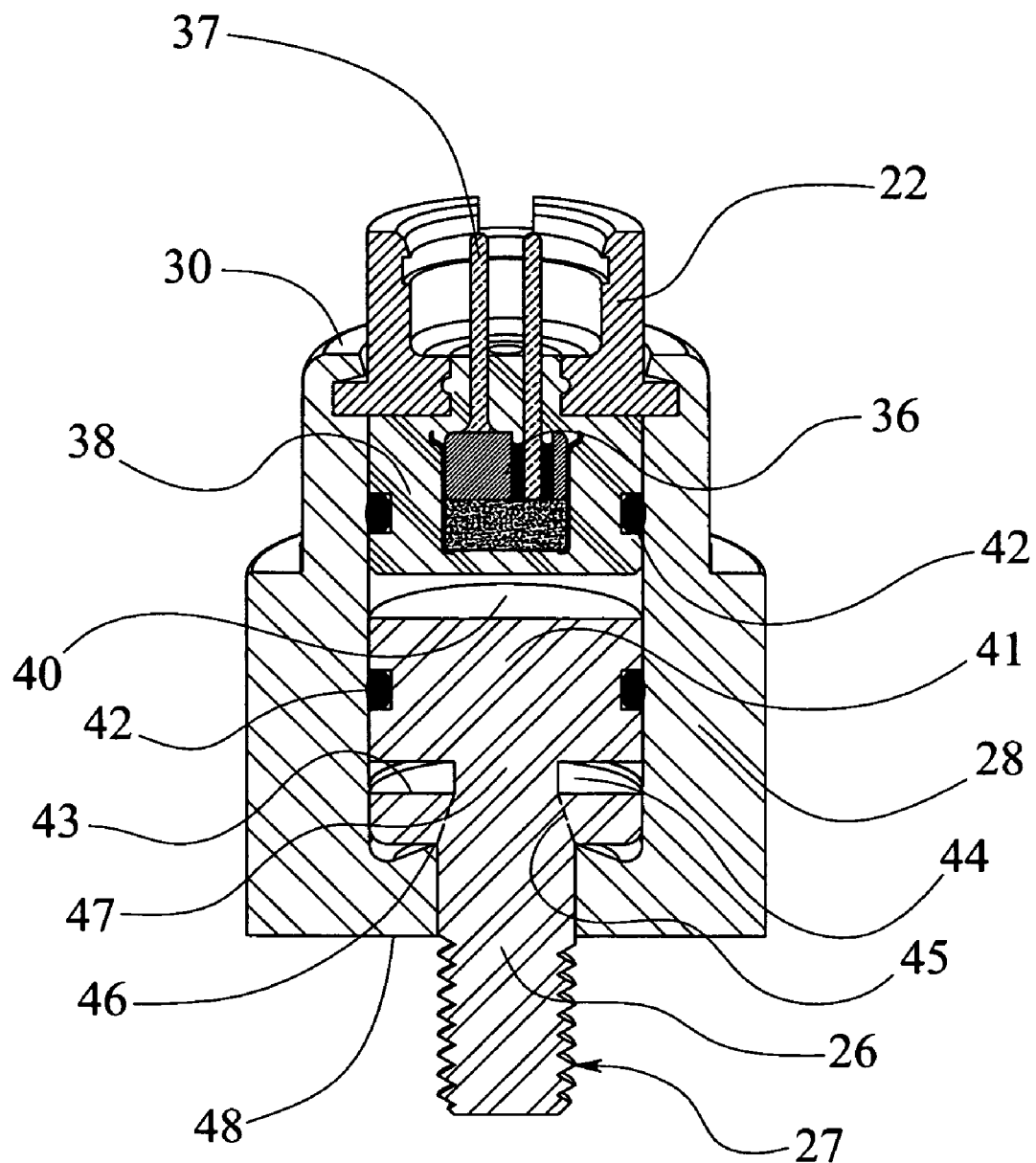
FIG. 2 is a sectional view of the embodiment of FIG. 1.

FIGS. 1 and 2 depict a first preferred embodiment of a quick-loosening mechanical linking device 20 according to the present invention, for use in an application such as a collapsible steering column. The main structural components of the quick-loosening mechanical linking device 20 are a housing 28 including a shoulder 48 and a hexagonal face 24 (for engaging a tool or other structure), a bolt 26 having threads 27, and a pyrotechnic initiator assembly 36 that includes a molding 38, electrical connectors 37, and a metallic retainer 22. The quick-loosening mechanical linking device 20 is assembled by placing an o-ring 42 around the head 41 of the bolt 26, inserting the bolt 26 within the housing 28 as shown in FIG. 2, placing another o-ring 42 around the molding 38 of the pyrotechnic initiator assembly 36, inserting the pyrotechnic initiator assembly 36 within the housing 28 as shown in FIG. 2, and crimping the top of the housing circumferentially around the flange of the metallic retainer 22, creating a crimp 30 that locks the pyrotechnic initiator assembly 36 in place and seals the quick-loosening mechanical linking device 20.

In use, an object (not shown) having a slotted hole is fastened with the quick-loosening mechanical linking device 20 by sliding the threads 27 of the bolt 26 through the slotted hole of the object to be fastened, and then screwing a nut or other threaded interface (not shown) onto the threads 27 until the object is secured against the shoulder 48. At the same time, the hexagonal face 24 may be secured by a tool or other structure to prevent the quick-loosening mechanical linking device 20 from rotating while the nut is screwed on. (The bolt 26 is prevented from rotating within the housing 28 during this process by the interference fit between them noted below; alternately, however, an internal feature such as a spar or other radial asymmetry could be employed to prevent slippage). It is noted that although the present embodiment employs bolt-like attachment features (including hexagonal face 24 and threads 27), one of ordinary skill in the art will recognize that, likewise, various other attachment features could alternately be adapted.

The bolt 26 includes a piston face 40 formed on its head 41, an abutment 43, a narrowed central portion 47, and a release zone preferably comprising an intended failure zone 45 that is generally conical or cylindrical in shape. A release cavity 44 having a predetermined height extends from the abutment 43 to the bottom of the head 41, and a boss 46 is formed on the bottom interior of the housing 28 beneath the abutment 43. There is preferably an interference fit between bolt 26 and housing 28, with the inner diameter of the housing 28 below the boss 46 preferably narrowing slightly (not shown) toward the bottom of the housing 28 and/or the outer diameter of the bolt 26 just below the boss widening slightly (not shown) toward the intended failure zone 45.

Upon actuation of the pyrotechnic initiator assembly 36 and the resulting generation of pressurized gas, this configuration, along with o-rings 42, ensures that enough pressure is contained between the housing 28 and the piston face 40 to cause the bolt 26 to press downwardly against boss 46 sufficiently to shear the bolt 26 along the intended failure zone 45, and then move the head 41, narrowed central portion 47, and lower region of the bolt 26 including the threads 27 downward until the bottom of the head 41 reaches abutment 43 (that is to say, a distance equal to the height of the release cavity 44). With the threads 27 of the bolt 26 and attached nut (or other threaded interface) thus extended, the fastened object is allowed to slide free from between it and the shoulder 48. The bolt 26 preferably remains permanently wedged in this extended position due to the slightly narrowed inner diameter of the housing 28 and/or slightly widened outer diameter of the bolt 26 mentioned above. Nevertheless, there is preferably adequate tolerance between the parts after actuation such that the pressure created by actuation of the pyrotechnic initiator assembly 36 is rapidly released from the housing 28 after failure and full extension of the bolt 26.

In order to allow the bolt 26 to shear and maintain normal static and dynamic axial loads, the material selected for the bolt 26 should have low elongation and high UTS properties, preferably a metal such as 1018 carbon steel. The housing 28 is preferably made of a suitable durable metal such as a carbon steel, and the molding 38 may be made of a suitable polymer such as nylon. In this depicted embodiment, the diameter of the shaft of the bolt 26 is 8 mm, the diameter of the head 41 is 16 mm, the diameter of the narrowed central portion 47 is less than or equal to 8 mm, the height of the intended failure zone 45 is 3 mm, and the height of the release cavity 44 is 2 mm. The pyrotechnic initiator assembly 36 includes a dual-load 60 mg ZPP, 200 mg THPP initiator (such as a standard automotive initiator commercially available from the assignee of the present application) having an all-fire current of 1.2 amps for 2 ms or 1.75 amps for 0.5 ms, insert-molded into the molding 38 with the metallic retainer 22.

Figure 3:
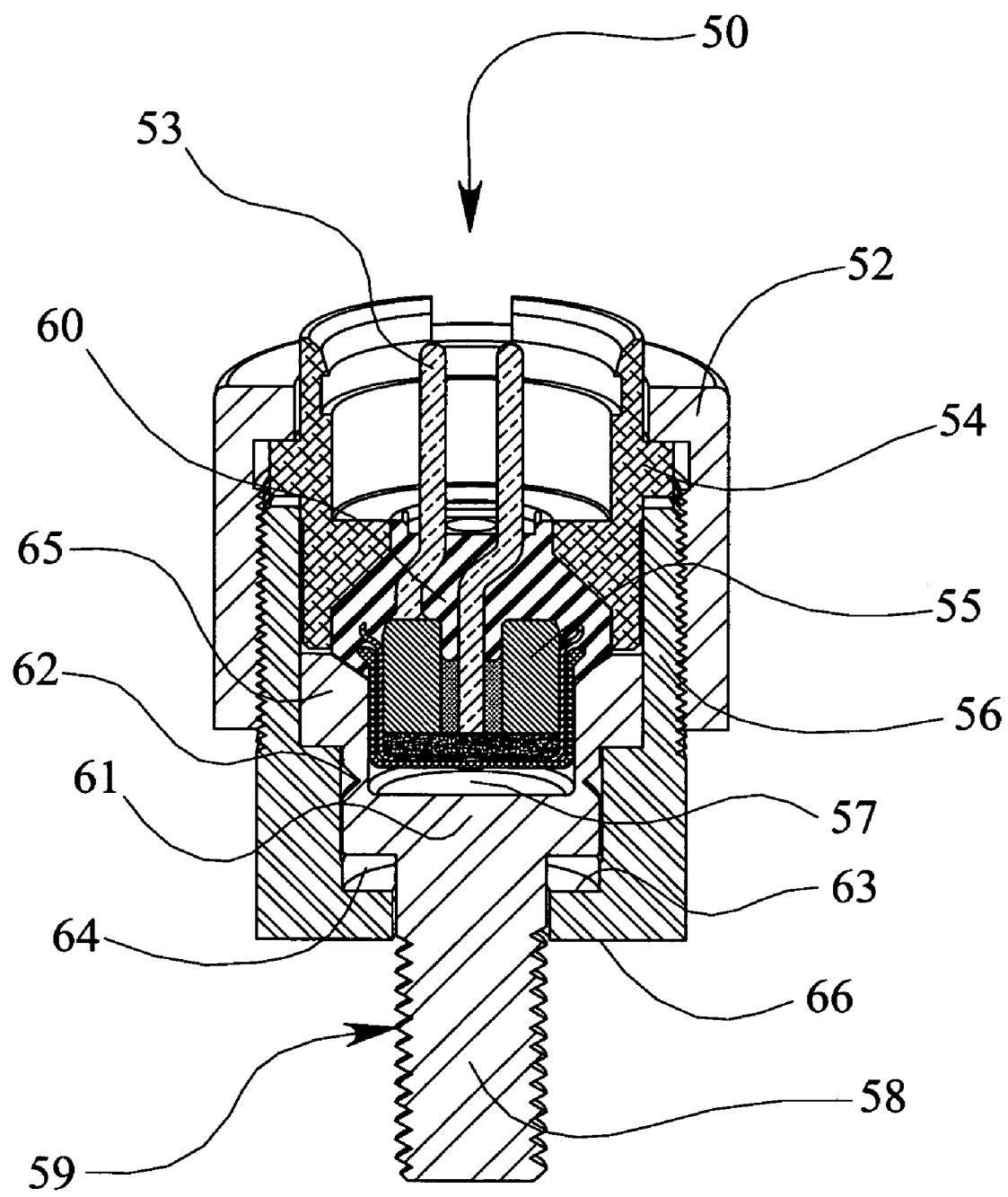
FIG. 3 is a sectional view, similar to that of FIG. 2, of a second embodiment of a quick-loosening mechanical linking device according to the present invention.

FIG. 3 depicts a second preferred embodiment of a quick-loosening mechanical linking device 50 according to the present invention. The main structural components of the quick-loosening mechanical linking device 50 are an upper housing 52, a lower housing 56 including a shoulder 66 and a face with an engagement feature such as flats (not shown), a bolt 58 having threads 59, and a pyrotechnic initiator assembly 55 that includes a molding 60, electrical connectors 53, and a metallic retainer 54. The quick-loosening mechanical linking device 50 is assembled by inserting the bolt 58 including its flared portion 65 within the lower housing 56 as shown, inserting the pyrotechnic initiator assembly 55 atop the bolt 58 as shown, and then screwing the upper housing 52 over the pyrotechnic initiator assembly 55 and down onto the lower housing 56, locking the pyrotechnic initiator assembly 55 and bolt 58 in place.

The bolt 58 includes a piston face 57 formed on its head 61 and a release zone preferably comprising an intended failure zone 62 that is generally annular in shape. The lower housing 56 includes an abutment 63 that defines the bottom of a release cavity 64, which extends a predetermined height up to the bottom of the head 61. There is preferably an interference fit between bolt 58 and lower housing 56, with the inner diameter of the lower housing 56 below the release cavity 64 preferably narrowing slightly (not shown) toward the bottom of the lower housing 56 and/or the outer diameter of the bolt 58 just below the release cavity widening slightly (not shown) toward the head 61.

Upon actuation of the pyrotechnic initiator assembly 55 and the resulting generation of pressurized gas, this configuration ensures that enough pressure is contained between the lower housing 55 and the piston face 57 to press the piston face 57 downwardly with enough force to cause the bolt 58 to fail in tension along the intended failure zone 62, and then move the head 61 and lower region of the bolt 58 including the threads 59 downward until the bottom of the head 61 reaches the abutment 63 (that is to say, a distance equal to the height of the release cavity 64). With the threads 59 of the bolt 58 and attached nut (or other threaded interface) thus extended, the fastened object is allowed to slide free from between it and the shoulder 66. The bolt 58 preferably remains permanently wedged in this extended position due to the slightly narrowed inner diameter of the lower housing 56 and/or slightly widened outer diameter of the bolt 58 mentioned above. Nevertheless, there is preferably adequate tolerance between the parts after actuation such that the pressure created by actuation of the pyrotechnic initiator assembly 55 is rapidly released after failure and full extension of the bolt 58.

In order to allow the bolt 58 to fail in tension and maintain normal static and dynamic axial loads, the material selected for the bolt 58 should have low elongation and high UTS properties, preferably a metal such as 1018 carbon steel. In this depicted embodiment, the diameter of the bolt 58 at the threads 59 is 6 mm, the diameter of the head 61 is 10 mm, the diameter of the flared portion 65 is 14 mm, the thickness of the intended failure zone 62 is 0.5 mm, and the height of the release cavity 64 is 2 mm. The pyrotechnic initiator assembly 55 includes a single-load 90 mg ZPP initiator (such as a standard automotive initiator commercially available from the assignee of the present application) having an all-fire current of 1.2 amps for 2 ms or 1.75 amps for 0.5 ms, insert-molded into the molding 60 with the metallic retainer 54.

Although the present invention has been described in detail in the context of a preferred embodiment of a collapsible steering column, one skilled in the art will appreciate that numerous variations, modifications, and other applications are also within the scope of the present invention. For example, in some applications it may be desired that there be a slower or more controlled extension of the bolt, and the release zone may be a zone of only partial failure and/or deformation rather than complete failure, in which case the bolt would extend in length but would not completely break. In such an embodiment, the material selected for the bolt may preferably have higher elongation properties. Further, the present invention can be used in any suitable application in which there is a need for rapid loosening of a mechanical link, for example, a releasable hood hinge for a vehicle. Thus, the foregoing detailed description is not intended to limit the invention in any way, which is limited only by the following claims and their legal equivalents.

What is claimed is:

1. A quick-loosening mechanical linking device, comprising;
   a) a housing;
   b) a release cavity having a predetermined height and a bottom, and including an abutment at said bottom;
   c) a bolt disposed within said housing and having an attachment means projecting out from said housing, an intended failure zone, and a head with a piston face; and,
   d) an actuator for selectively providing a pressure within said device adequate to cause said bolt to move farther out from said housing by a distance equal to said predetermined height of said release cavity;
   wherein said bolt is a single unitary piece.

2. The device of claim 1, wherein said intended failure zone is annular, conical, or cylindrical.

3. The device at claim 1, wherein said housing comprises a lower half and an upper half securely engaged with said lower half.

4. The device of claim 1, wherein said housing includes a rotary tool engagement means.

5. The device of claim 3, wherein said attachment means includes threads.

6. The device of claim 1, wherein said actuator is an electrical actuator and has an output end directed at said piston face.

7. The device of claim 6, further comprising a retainer, wherein said electrical actuator includes electrical connectors extending centrally through said retainer.

8. The device of claim 6, wherein said electrical actuator includes a pyrotechnic charge, the output force of which is matched to the dimensions and material of said intended failure zone so as to ensure failure of said intended failure zone upon actuation of said electrical actuator.

9. The device of claim 8, wherein said housing includes a rotary tool engagement means and said attachment means includes threads.

10. The device of claim 1, wherein said abutment is formed into said housing.

11. The device of claim 10, wherein said bolt includes a flared portion and said intended failure zone is between said head of said bolt and said flared portion of said bolt, and wherein said intended failure zone is annular.

12. The device of claim 1, wherein said abutment is formed into said bolt, and said bolt further includes a narrowed central portion between said abutment and said head of said bolt.

13. The device of claim 12, wherein said housing includes a BOBS beneath said abutment, and said intended failure zone is cylindrical or conical.

14. The device of claim 1, wherein said abutment is formed into said housing.

15. The device of claim 14, wherein said bolt includes a flared portion and said intended failure zone is between said head of said bolt and said flared portion of said bolt.

16. The device of claim 1, wherein said abutment is formed into said bolt, and said bolt further includes a narrowed central portion between said abutment and said head of said bolt.

17. The device of claim 16, wherein said housing includes a boss beneath said abutment.

18. A quick-loosening mechanical linking device, comprising:
   a) a housing;
   b) a release cavity having a predetermined height;
   c) an abutment at the bottom of said release cavity;
   d) a bolt disposed within said housing and having an attachment means projecting out from said housing, a release zone, a head with a piston face, and a narrowed central portion between said head and said abutment, wherein said abutment is formed into said bolt; and
   e) an actuator for selectively providing a pressure within said device adequate to cause said bolt to move farther out from said housing by a distance equal to said predetermined height of said release cavity.

* * * * *